April 18, 1950 R. B. DOME 2,504,662

INTERCARRIER TELEVISION RECEIVER CIRCUIT

Filed June 26, 1946

Inventor:
Robert B. Dome,
by Merton D Morse
His. Attorney.

Patented Apr. 18, 1950

2,504,662

UNITED STATES PATENT OFFICE 2,504,662

INTERCARRIER TELEVISION RECEIVER CIRCUIT

Robert B. Dome, Bridgeport, Conn., assignor to General Electric Company, a corporation of New York Application June 26, 1946, Serial No. 679,341

7 Claims. (Cl. 178—5.8)

My invention relates to high frequency circuits and, in particular, to circuits employed in television receivers. It is a primary object of my invention to effect certain improvements in television receiver circuits for simultaneously translating a plurality of signals variable over different bands of frequencies.

In the usual television receiver system, two intermediate frequency channels are employed at some stage following the first detection of the high frequency carriers for the video and audio signals. In the conventional television circuit, one of these intermediate frequency channels has a relatively broad band width characteristic and supplies the intermediate frequency signals corresponding to the video or picture signals. The other channel has a comparatively narrow band width characteristic and supplies the intermediate frequency signals corresponding to the audio or sound signals. Each channel, furthermore, is provided with its own second detector and subsequent amplifiers. It is apparent that certain advantages, both in operational characteristics and in design and cost, may be achieved if the signals may be supplied through a single intermediate channel. Accordingly, it is another object of my invention to provide a new and improved television receiver circuit which employs a single channel for translating both audio and video signals.

It is still another object of my invention to provide a new and improved television receiver circuit in which the tuned circuits thereof may be switched by means of push-button switches and satisfactory operation obtained without the requirement of additional manual adjustment.

One of the requirements of the circuits employed in the conventional television receiver is that the oscillator producing the locally generated oscillations for heterodyning purposes have a high frequency stability. Such requirements not only are difficult to meet, but the circuits necessary are extremely expensive. Accordingly, it is another object of my invention to provide a new and improved television receiver circuit of the superheterodyne type which permits a wider variation in frequency of the oscillations produced by a local oscillator included in the circuit.

It is a sill further object of my invention to provide a new and improved television receiver circuit in which the carrier wave of a video signal is employed as a heterodyning oscillation for audio modulated waves.

One of the features of my invention is the use of a single intermediate frequency channel having a broad band pass characteristic for translating both video and attenuated audio modulated waves and heterodyning the video and audio carrier waves. The resultant audio frequency modulated wave is detected in a discriminator circuit, amplified, and supplied to a loudspeaker.

Figure 1:
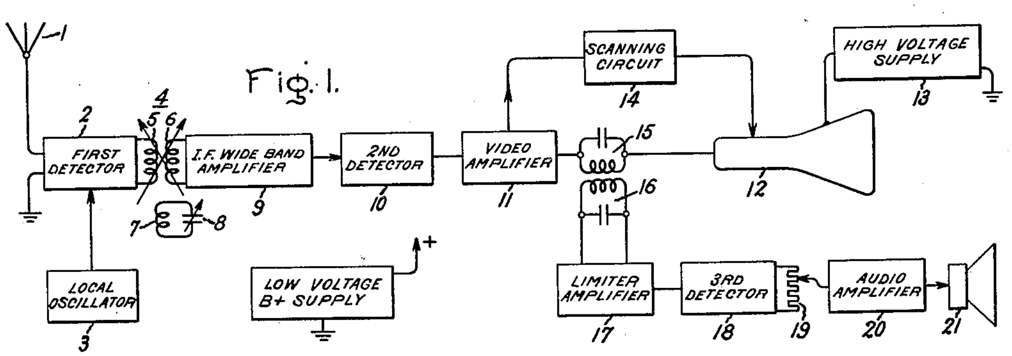
Figure 2:
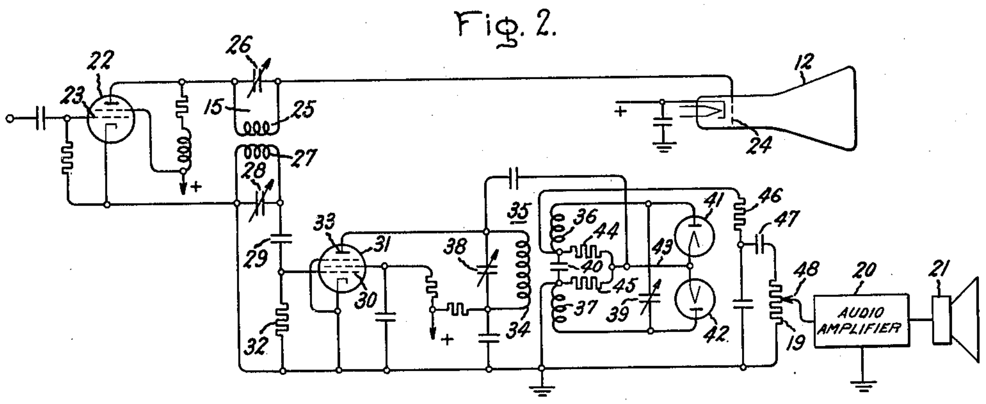
Figure 3:
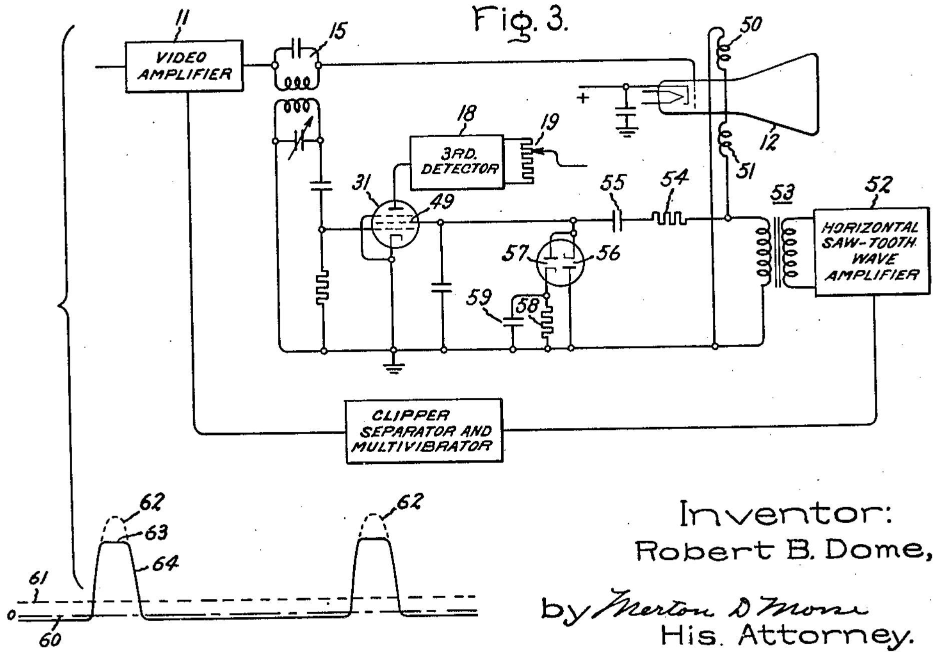

The features of my invention which I believe to be novel are set forth with particularity in the appended claims. My invention itself, however, both as to its organization and method of operation, together with further objects and advantages thereof, may best be understood by reference to the following description taken in connection with the accompanying drawing in which Fig. 1 represents a block diagram of a television receiver circuit embodying my invention; Fig. 2 is a detailed circuit diagram of a portion of the receiver circuit of Fig. 1; and Fig. 3 illustrates a modification of the circuit of Fig. 1.

Referring to Fig. 1, I have shown an antenna 1 for receiving television signals which comprises a picture carrier wave and an audio or sound carrier wave. The frequencies of these carrier waves are established at the transmitters themselves and, through government regulations, are separated in frequency by a frequency of 4.5 megacycles. This 4.5 megacycle frequency difference is of the order of, but slightly greater than, the maximum frequency component of a picture signal that is transmitted. Thus, for example, the video carrier wave frequency may be 51.25 megacycles and the sound carrier wave frequency employed by the same transmitter has a frequency of 55.75 megacycles. The antenna 1 supplies the received carriers to a first detector 2 where they are mixed with waves or oscillations generated locally in a local oscillator 3. The output circuits of the first detector 2, therefore, include both a video intermediate frequency carrier wave and a sound intermediate frequency carrier wave, these two waves being separated by a frequency difference of 4.5 megacycles. Thus, for example, in the case of the frequencies mentioned above, the local oscillator may be set to provide waves of a frequency of 67.5 megacycles so that in the output of the first detector circuits the video intermediate frequency carrier has a frequency of 16.25 megacycles and the sound intermediate carrier wave has a frequency of 11.75 megacycles.

The signals at the output of the detector 2 are supplied to an attenuator 4 which comprises a transformer having a pair of windings 5, 6 tuned to the frequency of the video intermediate frequency carrier and a tertiary winding 7 which is tuned by means of a variable capacitance 8 substantially to the frequency of the sound intermediate frequency carrier wave. The coupling between the winding 7 and the windings 5, 6 is adjusted so that the attenuator 4 reduces the ratio of the sound to the video waves. Thus, waves of the sound intermediate frequency which are supplied to an intermediate frequency amplifier 9 may have an intensity which is only from 1% to 15% the intensity of the video intermediate frequency waves supplied to the amplifier. By such reduction of the intensity of the sound waves relative to the video waves, I reduce the amount of cross modulation between the sound and video signals in a second detector 10 connected to the output of the amplifier 9. Furthermore, in accordance with my invention, the amplifier 9 is given a wide band frequency characteristic so that satisfactory amplification and transmission of both the video and sound intermediate frequency carrier waves are provided.

The second detector 10 is provided to mix the video intermediate frequency carrier wave and the attenuated sound intermediate frequency carrier wave. Thus, in the second detector, the video intermediate frequency carrier wave is utilized as an oscillation for heterodyning with the sound intermediate frequency carrier wave so that in the output of the second detector tube there appears not only the video signals, but also the difference frequency of the video and sound intermediate frequency carrier waves. As previously pointed out, this difference frequency is 4.5 megacycles. It is well known that the conventional television transmitter employs frequency modulation for transmitting sound signals. Consequently, the 4.5 megacycle wave, which is present in the output of the second detector 10, is a frequency modulated wave.

The complete video wave and the 4.5 megacycle sound intermediate frequency wave are amplified in a wide band amplifier 11 to a level suitable for application to a picture cathode ray tube 12. The picture tube 12 is conventional in form and the details thereof form no part of my present invention. The picture tube 12 may be supplied with relatively high voltages for operation from a high voltage supply 13 and may be supplied with the usual scanning potentials from a scanning circuit 14 which is connected to the video amplifier. The function of the scanning circuit 14 is to utilize, in a well-known manner, the synchronizing signal portion of a received television signal to obtain potentials for deflecting the cathode ray beam of the tube 12 in horizontal and vertical directions.

I provide means for removing the audio intermediate frequency carrier waves from the signals supplied to the picture tube 12. This means comprises a filter circuit 15 tuned to 4.5 megacycles, the frequency of the audio intermediate frequency carrier wave present in the output of the amplifier 11. The filter 15 is coupled to the input circuit 16 of a limiter amplifier 17. The remainder of the audio circuit includes a third detector 18 which demodulates the frequency modulated audio intermediate frequency wave and supplies, through a volume control 19, audio signals to an audio amplifier 20. The output circuits of the amplifier 20 may be coupled in a conventional manner to a loudspeaker 21.

In Fig. 2, I have shown the circuit arrangement by which the audio intermediate frequency carrier wave of 4.5 megacycles is removed from the picture tube 12 and utilized for providing audio output voltages to the speaker 21. This circuit comprises a final amplifier 22 of the video amplifier circuit, to the control grid 23 of which are supplied both the video signals and the sound modulated 4.5 megacycle carrier from the preceding portions of the receiver circuit. The anode of the amplifier 22 is coupled through the filter 15 to the control electrode 24 of the picture tube 12. The filter 15 comprises an inductance 25 and a variable capacitance 26 by which the filter circuit may be tuned to resonate at 4.5 megacycles, the carrier frequency of the sound modulated wave. The circuit 15 thus serves as a final wave trap to keep the 4.5 megacycle wave out of the picture. Coupled to the inductance 25 is an inductance 27 which is tuned by means of a capacitance 28 to the frequency of the resonant circuit 15. The elements 27, 28 are coupled through a grid blocking condenser 29 to the control electrode 30 of a limiter amplifier tube 31. A grid leak 32 is connected between the control electrode 30 and the cathode of the tube 31 to provide a path for unidirectional grid current flow. The anode 33 of the tube 31 is connected to the primary winding 34 of a discriminator transformer 35.

The discriminator circuit may be of any well-known form and is illustrated as including secondary windings 36, 37 of the transformer 35. The primary winding 34 is resonated by means of a capacitance 38 at the frequency of the sound 4.5 megacycle carrier wave. The secondary windings are likewise resonated at the same frequency by means of a variable capacitance 39. The adjacent terminals of the secondary windings 36, 37 are connected to a capacitance 40 and the opposite terminals of these windings are connected, respectively, to the anodes of the diodes 41, 42. The cathodes of the diodes 41, 42 are connected together and through a conductor 43 to the common terminal of a pair of load resistances 44, 45. The opposite terminal of the resistance 45 is connected to ground, while the opposite terminal of the resistance 44 is connected through a resistance 46 and a coupling condenser 47 to the volume control potentiometer 19. The potentiometer 19 includes a variable contact 48 which is connected to the audio amplifier 20.

An alternative method of deriving audio signal frequencies from the continuous 4.5 megacycle intermediate frequency wave is shown in Fig. 3. This circuit arrangement is essentially the same as that shown in Fig. 2 with the exception of the connection to the screen electrode in the limiter amplifier 31. By virtue of this connection of the screen electrode, the screen electrode 49 is employed to control conduction through the limiter amplifier 31 during periods when no picture signals are being received, but in which the cathode ray beam of the tube 12 is being returned to the starting point of its horizontal sweep, that is, during the horizontal retrace period.

In Fig. 3, the potential for the screen electrode 49 is obtained from the voltage applied across the horizontal deflection coils 50, 51 of the cathode ray tube 12. The voltage for the coils 50, 51 may be derived from scanning voltage circuits 14 (shown in Fig. 1) conventionally employed in a television receiver. Such circuits comprise the usual clipper, separator, and multivibrator circuits and include an amplifier 52 for a sawtooth wave which is to be applied to the horizontal deflection coils 50, 51. The output of the amplifier 52 is impressed across the primary winding of a transformer 53. The coils 50, 51 are connected in series across the secondary winding of this transformer. The potential across the horizontal deflection coils 50, 51 is likewise supplied to the screen electrode 49 through a resistance 54 and a coupling capacitor 55. A pair of reversely connected diodes 56, 57 are likewise connected between the screen electrode 49 and ground potential. The diode 56 has its cathode connected to the screen electrode 49 and its anode connected to ground and operates to establish a level for the unidirectional voltages supplied to the screen electrode 49. The anode of the diode 57 is connected to the screen electrode 49 and its cathode is connected to ground through a resistance 58 shunted by a capacitance 59.

The operation of the diodes 56, 57 may best be explained by reference to the voltage curves illustrated in the lower portion of Fig. 3. If zero unidirectional potential for the screen electrode circuit is illustrated by the horizontal line 60, the horizontal line 61 illustrates the average unidirectional voltage level or positive bias which is established in the screen electrode circuit through the operation of the diode 56. Thus, this diode prevents the screen electrode 49 from being driven to large negative potentials, a result which would be obtained through normal grid rectification by the action of either the diode 57 or the rectification action of the screen electrode 49 and cathode of the limiter amplifier 31. The diode 57 functions to remove the peaks 62 from the voltage pulse which would otherwise be supplied to the screen electrode 49, clipping the upper portion of the voltage wave so that it is provided with a substantially flat top 63.

In the operation of the circuit of Fig. 3, the continuous 4.5 megacycle wave frequency modulated with desired audio signals is removed from the circuit of the picture tube 12 through the action of the filter 15 and is supplied to the limiter amplifier 31. The screen electrode circuit of the tube 31 functions to prevent transmission of the 4.5 megacycle wave through the device 31 at all times, except during the horizontal retrace period of a received television signal. Thus, a slightly negative bias is supplied to the screen electrode 49 during a picture signal period of a received television signal. Positive potential is supplied to the screen electrode 49 only during the intervals when horizontal blanking and synchronizing pulses are being received. During such intervals, the portion of the resultant screen electrode voltage wave 64 which includes the flat top 63 removes the negative bias from screen electrode 49 and permits transmission of the 4.5 megacycle wave to the third detector or discriminator 18 and ultimately to the loudspeaker of the receiver.

One of the advantages of my improved audio system for television receivers is that it permits the use of push button switches which are reliable in operation and do not require an additional manual adjustment for tuning a local oscillator to an exact frequency. Such a manual adjustment has been required heretofore in television receivers employing push button switches for adjusting the audio circuits as uncontrollable shifts in the heterodyning frequencies occur, which causes the sound intermediate frequency wave to be produced at some frequency other than the one to which the narrow and selective sound intermediate frequency circuit is tuned.

Another important advantage of my improved system is that, once the circuits have been tuned in the original adjustment of the receiver, the audio circuits are reliably established and require no further attention. In a receiver embodying my circuit, I have found that the frequency of the local oscillator 3 may be changed over a wide range without adversely affecting the reception of the audio frequencies. Thus, the local oscillator frequency may be so detuned that the video intermediate frequency carrier wave is almost completely exterminated, causing complete loss of picture on the picture tube 12, without seriously affecting the quality or volume of the sound translated to the speaker 21. Thus, it is apparent that a range of drift of local oscillator frequency considerably greater than formerly permitted may be tolerated in a receiver which includes my improved audio frequency translating circuits. Furthermore, I have found that, due to the limiting action of the limiter amplifier, the gain of the video amplifier 11 may be varied over a wide range without seriously affecting the sound level from the loudspeaker 21.

While I have shown and described one particular embodiment of my invention, it will occur to those skilled in the art that many changes and modifications may be made without departing from my invention, and I therefore aim in the appended claims to cover all such changes and modifications as fall within the true spirit and scope of my invention.

What I claim as new and desire to secure by Letters Patent of the United States is:

1. In a television receiver adapted to receive a picture signal modulated carrier wave and a continuous carrier wave modulated by an audio frequency signal, said waves having frequencies spaced apart in the frequency spectrum by a constant frequency difference greater than but of the order of the maximum frequency component of the picture signal, means for converting both of said waves to waves of different frequencies, a single channel adapted to translate both of said converted waves, means for mixing said converted waves to reproduce said picture signals and to provide an audio modulated carrier wave having a mean frequency equal to the difference between the frequencies of said carrier waves, a cathode ray tube having a scanning circuit connected therewith, means connected to said channel for supplying picture signals to said tube, means for removing said difference frequency from said channel and for reproducing said audio signals from said difference frequency wave, said last means including an electron discharge device having a screen electrode, means connected to said scanning circuit for rectifying current therein, and means supplying said rectified current to said screen electrode with a polarity such that said device is rendered non-conductive during periods when a picture signal is being received and conductive during periods when a blanking pulse is being received.

2. In a television receiver, means to receive a television signal band including a video carrier having successive picture and retrace modulation intervals and a related audio frequency modulated carrier, said carriers being separated in frequency by a constant difference frequency, a single channel connected to translate said carriers, means for mixing said carriers to produce a video wave and an audio modulated carrier wave having a frequency equal to said difference frequency, means for developing a keying wave from said video wave, means utilizing said keying wave to select those portions of said difference frequency carrier wave which occur during said retrace intervals, a frequency discriminator tuned to said difference frequency, means for supplying said selected portions of said difference frequency carrier wave to said discriminator, and a reproducing device responsive to the output from said discriminator.

3. In a television receiver, means to receive a television signal band including a video carrier having successive picture and retrace modulation intervals and a related audio frequency modulated carrier, said carriers being separated in frequency by a constant difference frequency, a single channel connected to translate said carriers, means for mixing said carriers to produce a video wave and an audio modulated carrier wave having a frequency equal to said difference frequency, means for delevoping a keying wave from said video wave, a frequency discriminator tuned to said difference frequency, means including an electron discharge device for supplying said difference frequency carrier wave to said discriminator, means utilizing said keying wave for rendering said device conductive only during said retrace intervals thereby to supply said difference frequency carrier wave to said discriminator only during said retrace intervals, and a reproducing device responsive to the output from said discriminator.

4. In a television receiver, means to receive a television signal band including a video carrier having successive picture and retrace modulation intervals and a related audio modulated carrier, said carriers being separated in frequency by a constant difference frequency, means for converting both said carriers to waves of different frequencies, a single channel adapted to translate both of said converted waves, means for mixing said converted waves to reproduce said video modulations and to provide an audio modulated carrier wave having a frequency equal to said difference frequency, means for developing a keying wave from said video modulations, means utilizing said keying wave to select those portions of said difference frequency carrier wave which occur during said retrace intervals, a frequency discriminator tuned to said difference frequency, means for supplying said selected portions of said difference frequency carrier wave to said discriminator, and a reproducing device supplied with the output from said discriminator.

5. In a television receiver, means to receive a television signal band including a video carrier having successive picture and retrace modulation intervals and a related audio modulated carrier, said carriers being separated in frequency by a constant difference frequency, means for converting both said carriers to waves of different frequencies, a single channel adapted to translate both of said converted waves, means for mixing said converted waves to reproduce said video modulations and to provide an audio modulated carrier wave having a frequency equal to said difference frequency, means for developing a keying wave from said video modulations, a frequency discriminator tuned to said difference frequency, means including an electron discharge device for connecting said difference frequency carrier wave to said discriminator, means utilizing said keying wave for rendering said device conductive only during said retrace intervals thereby to supply said difference frequency carrier wave to said discriminator only during said retrace intervals, and a reproducing device responsive to the output from said discriminator.

6. In a television receiver, means to receive a television signal band including a video carrier having successive picture and retrace modulation intervals, and a related audio modulated carrier, said carriers being separated in frequency by a constant difference frequency, means for converting both said carriers to waves of different frequencies, a single channel adapted to translate both of said converted waves, means for mixing said converted waves to reproduce said video modulations and to provide an audio modulated carrier wave having a frequency equal to said difference frequency, means for developing a keying wave from said video modulations, means for reproducing said audio signals from said difference frequency carrier wave, said last named means including an electron discharge device having a screen electrode, and means to supply said keying wave to said screen electrode thereby to render said device conductive only during said retrace intervals.

7. In a television receiver, means to receive a television signal band including a video carrier having successive picture and retrace modulation intervals and a related audio modulated carrier, said carriers being separated in frequency by a constant difference frequency, means for converting both of said carriers to waves of different frequencies, a single channel adapted to translate both of said converted waves, means for mixing said converted waves to reproduce said video modulations and to provide an audio modulated carrier wave having a frequency equal to said difference frequency, means for developing a keying wave from said video modulations, said keying wave comprising pulses which occur during said retrace intervals, an electron discharge device having first and second control electrodes, means for supplying said difference frequency carrier wave to said first control electrode, means for supplying said keying pulses to said second electrode with a polarity to render said device conductive during said keying pulses thereby to select those portions of said difference frequency carrier wave which occur during said keying pulses, and means for reproducing said audio signals from the selected portions of said difference frequency carrier wave.

ROBERT B. DOME.

REFERENCES CITED

The following references are of record in the file of this patent:

UNITED STATES PATENTS

| Number | Name | Date |
|---|---|---|
| 1,457,447 | Mills | June 5, 1923 |
| 1,465,961 | Alexanderson | Aug. 28, 1923 |
| 1,495,470 | Farrington | May 27, 1924 |
| 1,629,685 | Ditcham | May 24, 1927 |
| 1,681,564 | Wright | Aug. 21, 1928 |
| 1,735,134 | Schroter | Nov. 12, 1929 |
| 1,797,317 | Brand | Mar. 24, 1931 |
| 2,056,607 | Holmes | Oct. 6, 1936 |
| 2,118,610 | Koch | May 24, 1938 |
| 2,146,876 | Zworykin | Feb. 14, 1939 |
| 2,164,745 | Kentner | July 4, 1939 |
| 2,268,001 | Franholz | Dec. 30, 1941 |
| 2,350,902 | Kallman | June 6, 1944 |
| 2,403,957 | Seeley | July 16, 1946 |
| 2,448,908 | Parker | Sept. 7, 1948 |

OTHER REFERENCES

Proceedings I. R. E., Feb. 1946, page 56. (Copy in Div. 16.)

Certificate of Correction

Patent No. 2,504,662

April 18, 1950

ROBERT B. DOME

It is hereby certified that errors appear in the printed specification of the above numbered patent requiring correction as follows:

Column 6, line 32, strike out "adapted" and insert instead a comma and the word , *means*;

and that the said Letters Patent should be read with these corrections therein that the same may conform to the record of the case in the Patent Office.

Signed and sealed this 26th day of September, A. D. 1950.

[SEAL]

THOMAS F. MURPHY,
*Assistant Commissioner of Patents.*